United States Patent [19]
Hobaugh

[11] Patent Number: 5,460,574
[45] Date of Patent: Oct. 24, 1995

[54] VARIABLE LENGTH SHAFT ASSEMBLY WITH A LASH BUSHING

[75] Inventor: James M. Hobaugh, Lafayette, Ind.

[73] Assignee: TRW Inc., Lyndhurst, Ohio

[21] Appl. No.: 114,682

[22] Filed: Aug. 31, 1993

[51] Int. Cl.⁶ ........................................ F16D 3/06
[52] U.S. Cl. ..................... 464/162; 403/359; 464/89; 464/180
[58] Field of Search ................. 464/89, 83, 162, 464/180; 403/359

[56] References Cited

U.S. PATENT DOCUMENTS

| | | | |
|---|---|---|---|
| 2,466,218 | 4/1949 | Farrell et al. | 464/89 |
| 2,737,033 | 3/1956 | Bendall | 464/89 |
| 3,003,339 | 10/1961 | Haushalter | 464/89 |
| 4,622,022 | 11/1986 | Diffenderfer et al. | 464/162 |
| 4,667,530 | 5/1987 | Mettler et al. | 403/359 |
| 4,705,491 | 11/1987 | Andersson | 464/180 |
| 4,798,268 | 1/1989 | Fargier et al. | 403/359 |

FOREIGN PATENT DOCUMENTS 881355  11/1961  United Kingdom ................. 464/162

Primary Examiner—Daniel P. Stodola
Assistant Examiner—Eileen A. Dunn
Attorney, Agent, or Firm—Tarolli, Sundheim & Covell

[57] ABSTRACT

A shaft assembly (10) has a first shaft (14) which extends along an axis (20) and a second shaft (16) which extends along the axis (20). The second shaft (16) extends into a hollow interior of the first shaft (14). The first and second shafts (14, 16) are axially movable relative to each other. A bushing (12) is located between the first and second shafts (14, 16) for allowing generally free axial movement between said first and second shafts (14, 16), and transmitting torque between the first and second shafts (14, 16). The bushing has flange segments (64) and tangs (66) for preventing axial movement of the bushing (12) relative to the first shaft (14). The bushing (12) also has wedge-shaped side portions (40) located in wedge-shaped gaps (138) defined by the first and second shafts (14, 16). The wedge-shaped side portions (40) are slidable under the influence of springs (38) radially along the gaps (138) to take up wear and to prevent lash between the first and second shafts (14, 16).

15 Claims, 5 Drawing Sheets

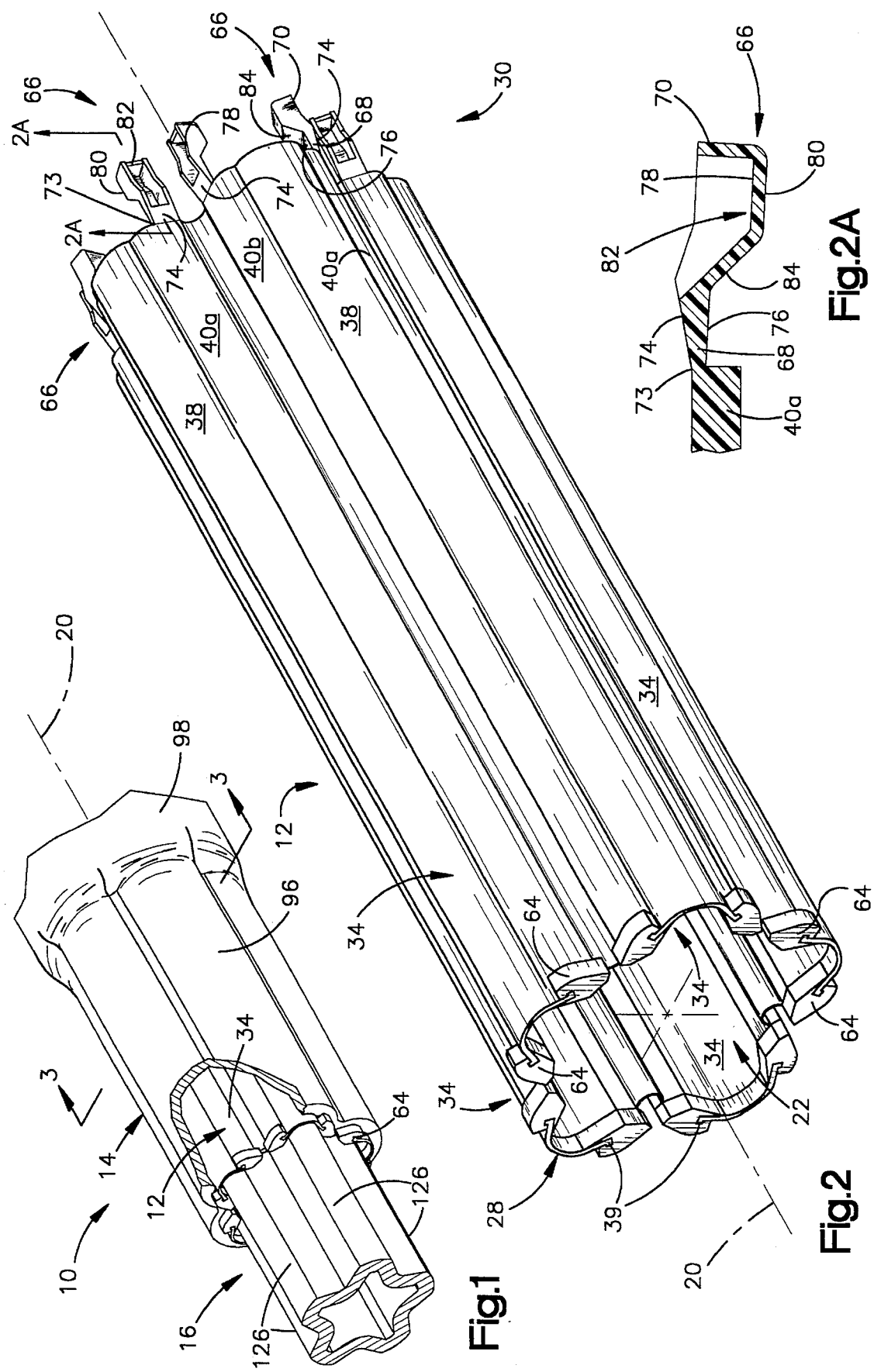

5,460,574

VARIABLE LENGTH SHAFT ASSEMBLY WITH A LASH BUSHING

BACKGROUND OF THE INVENTION

The present invention relates to a shaft assembly which includes first and second coaxial telescoping shafts and a bushing which transmits torque between the shafts and permits relative axial movement between the shafts. The present invention also relates to a method of assembling the shaft assembly.

A shaft assembly which includes two telescoping shafts and a bushing which transmits torque between the shafts and permits relative axial movement between the shafts is known. U.S. Pat. No. 4,667,530 discloses one such shaft assembly. Typically, the bushing is constructed so that the shaft assembly is as free of lash as possible.

SUMMARY OF THE INVENTION

The present invention includes a shaft assembly and a method of assembling the shaft assembly. The shaft assembly includes a tubular first shaft which extends along an axis. The first shaft has an open end and an interior surface which has a plurality of elongate grooves. The elongate grooves extend parallel to the axis.

The shaft assembly also includes a second shaft which extends along the axis. The first and second shafts are axially movable relative to each other. The second shaft has an end portion located within the first shaft. The second shaft has an exterior surface which has a plurality of elongate projections. The elongate projections extend parallel to the axis and mate with the elongate grooves of the first shaft. The elongate projections extend into the elongate grooves such that the projections and grooves are in interference in a circumferential direction and can be used to transmit rotation and torque from one of the shafts to the other. The exterior surface of the second shaft and the interior surface of the first shaft define an inwardly tapered gap on each side of each elongate projection.

The shaft assembly includes a bushing for transmitting torque between the first and second shafts. The bushing extends into the first shaft. The bushing includes parts for preventing axial movement of the bushing relative to the first shaft. The parts of the bushing which prevent axial movement of the bushing relative to the first shaft include a flange which abuts against the open end of the first shaft.

The bushing also includes a plurality of wedge-shaped bearing segments located within the tapered gaps on each side of each elongate projection on the second shaft. The wedge segments transmit torque between the first and second shafts.

The bushing also includes a plurality of spring portions which bias each wedge segment into its respective tapered gap. The spring portions bias each wedge segment into engagement with the exterior surface of the second shaft and the interior surface of the first shaft which define the tapered gap. Thus, in the event of wear of a wedge segment, the wear is taken up, lash due the bearing wear is removed, and rotation of one shaft relative to the other shaft does not result. The wedge segments are slidable transverse to the axis along the respective tapered gaps and slidable generally radially relative to the exterior surface and the interior surface to provide the wear take up.

The bushing has a plurality of longitudinally extending wedge-shaped portions, a plurality of spring portions, a plurality of hinge portions, first projections at a first end of the bushing and second projections at the second end of the bushing. Pairs of adjacent wedge-shaped portions are interconnected by one of the spring portions to form longitudinally extending lobes. Adjacent lobes are interconnected by one of the hinge portions. The first projections extend transverse to the longitudinal extent of the bushing at the first end of the bushing, and the second projections at least partially extend transverse to the longitudinal extent of the bushing at the second end of the bushing.

The bushing is formed in the flat and is then rolled into a tube-like element. As a result of the rolling, the hinge portions are flexed and the first projections of the bushing extend radially outward to provide a flange. The bushing, when rolled into a tube-like element, is positioned within the first shaft.

Each of the hinge portions of the bushing is positioned to extend between adjacent elongate grooves of the first shaft. Each of the wedge-shaped portions of the bushing is positioned in engagement with one of the sides of the elongate grooves. The spring portions are located adjacent to a closed end of each of the elongate grooves. The first projections of the bushing overlie and engage the end of the first shaft and prevent the bushing from entering the first shaft.

After the bushing is located in the first shaft, the second shaft is located within the bushing. Each side of each of the elongate projections of the second shaft is positioned in engagement with one of the wedge-shaped portions of the bushing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a partially broken away view of a shaft assembly constructed in accordance with the present invention;

FIG. 2 is a view of a part of the shaft assembly;

FIG. 2A is a sectional view taken along line 2A—2A of FIG. 2;

DESCRIPTION OF A PREFERRED EMBODIMENT

Figure 3:
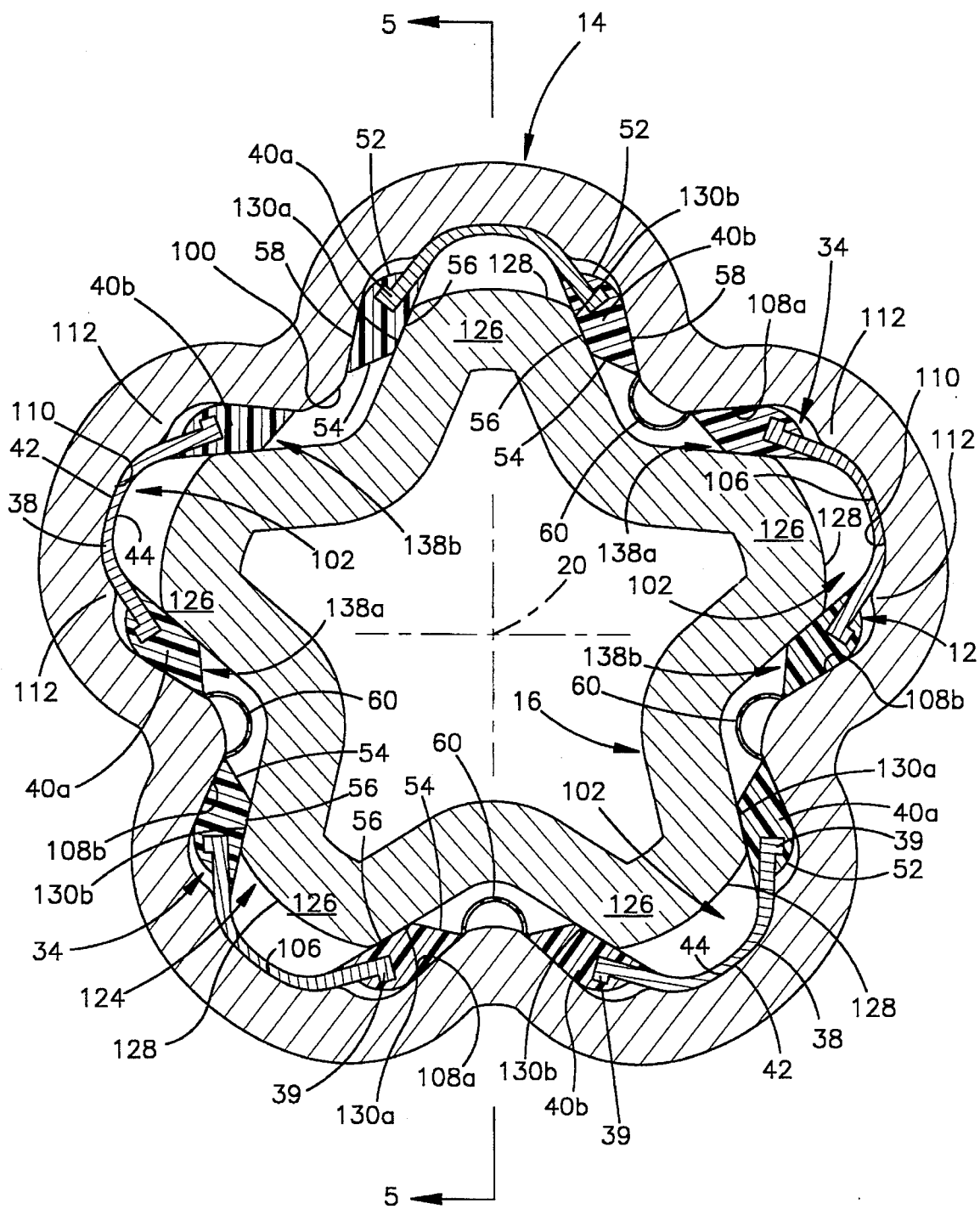
FIG. 3 is a sectional view taken along line 3—3 in FIG. 1.

A shaft assembly 10 constructed in accordance with the present invention is illustrated in FIG. 1. The shaft assembly 10 includes a first shaft 14, a second shaft 16, and a bushing 12 interposed between the first and second shafts 14 and 16. The bushing 12 transmits torque between the first and second shafts 14 and 16. The first shaft 14, the second shaft 16 and the bushing 12 extend along an axis 20. The first shaft 14 is axially movable relative to said second shaft 16 for adjusting the overall length of the shaft assembly 10.

The bushing 12 (FIG. 2) is a generally star-shaped tube-like member and has a hollow interior 22. The bushing has a first end portion 28 and a second end portion 30. In the preferred embodiment, the bushing 12 includes five elongate lobes 34 which extend between the first and second end portions 28 and 30.

Each lobe 34 (FIG. 3) has an arcuate center spring portion 38. The spring portion 38 is U-shaped and resilient. Each spring portion 38 is made of spring steel. Each spring portion 38 has a foot portion 39 on each side.

Each lobe 34 also has a wedge-shaped side portion 40 adjacent to each side of the spring portion 38. The wedge-shaped side portions 40 on either side of the spring portion 38 are identified as 40a and 40b, respectively. Each spring portion 38 and each wedge-shaped side portion extends between the first and second end portions 28 and 30.

Each spring portion 38 has an exterior surface 42 and an interior surface 44. The exterior surface 42 faces away from the axis 20 and the interior surface 44 faces toward the axis 20. The spring portion 38 has a thickness between the exterior and interior surfaces 42 and 44 which permits resilient flexing.

The wedge-shaped side portions 40 are made of durable polymeric material, such as plastic, and are formed over the foot portions 39 of the respective spring portions 38. In the preferred embodiment, the polymeric material is an elastomeric polymer, such as nylon. As shown in the cross-sectional view of FIG. 3, each wedge-shaped side portion 40 has an outer surface 52, an inner surface 54, a first side surface 56 and a second side surface 58. The outer surface 52 faces away from the axis 20 and the inner surface 54 faces toward the axis 20. The first and second side surfaces 56 and 58 are inclined relative to each other to define a wedge-shape of the respective wedge-shaped side portion 40. The wedge-shape of each wedge-shaped side portion 40 has a thickness which gradually decreases or tapers, inwardly from the outer surface 52 toward the inner surface 54.

A resilient hinge 60 extends between each pair of adjacent lobes 34, except for one pair of adjacent lobes 34. The hinges 60 are made of durable polymeric material, such as plastic. In the preferred embodiment, the polymeric material is an elastomeric polymer, such as nylon. Each hinge 60 connects the wedge-shaped side portion 40a of one of the pair of adjacent lobes 34 to the wedge-shaped side portion 40b of another of the pair of adjacent lobes 34. Each hinge 60 has a thickness which permits resilient flexibility. Each hinge 60 extends between the first and second end portions 28 and 30 (FIG. 2).

At the first end portion 28, each lobe 34 has a pair of flange segments 64. The flange segments 64 are made of durable polymeric material, such as plastic. In the preferred embodiment, the polymeric material is an elastomeric polymer, such as nylon. The flange segments 64 are connected to respective wedge-shaped side portions 40 of the lobes 34. Each flange segment 64 projects radially outwardly from the respective wedge-shaped side portion 40. The flange segments 64 extend transverse to the axis 20.

At the second end portion 30 each lobe 34 has a pair of tangs 66. The tangs 66 are made of durable polymeric material, such as plastic. In the preferred embodiment, the polymeric material is an elastomeric polymer, such as nylon. Each tang 66 is finger-like and has a wedge-shape portion 68, and a foot portion 70 (FIG. 2A). Each tang 66 is connected by a flexible segment 73 to respective wedge-shaped side portions 40 of the lobes 34. Each wedge-shaped portion 68 has an exterior surface 74 and an interior surface 76. Each exterior surface 74 faces generally away from the axis 20 and each interior surface 76 faces generally toward the axis 20.

Each exterior surface 74 slopes radially outward from the respective spring portion 38. Each exterior surface 74 extends transverse to the axis 20. Each wedge-shaped portion 68 has a thickness measured between the respective exterior and interior surfaces 74 and 76. The thickness of each wedge-shaped portion 68 increases away from the connection between the respective flexible segment 73 and the respective wedge-shaped side portion 40 toward the respective foot portion 70.

Each foot portion 70 is connected to the respective wedge-shaped portion 68 remote from the respective wedge-shaped side portion 40. Each foot portion 70 has an exterior surface 78 and an interior surface 80. Each exterior surface 78 faces generally away from the axis 20 and each interior surface 80 faces generally toward the axis 20.

Each exterior surface 78 defines a concavity 82 in the respective foot portion 70. The concavities 82 merely prevent deformation of the foot portions 70 during forming of the bushing 12 due to plastic strain. Each interior surface 80 has a sloped surface segment 84. Each sloped surface segment 84 extends from the respective interior surface 76 of the wedge-shaped portion 68 at an angle toward the axis 20.

Figure 5:
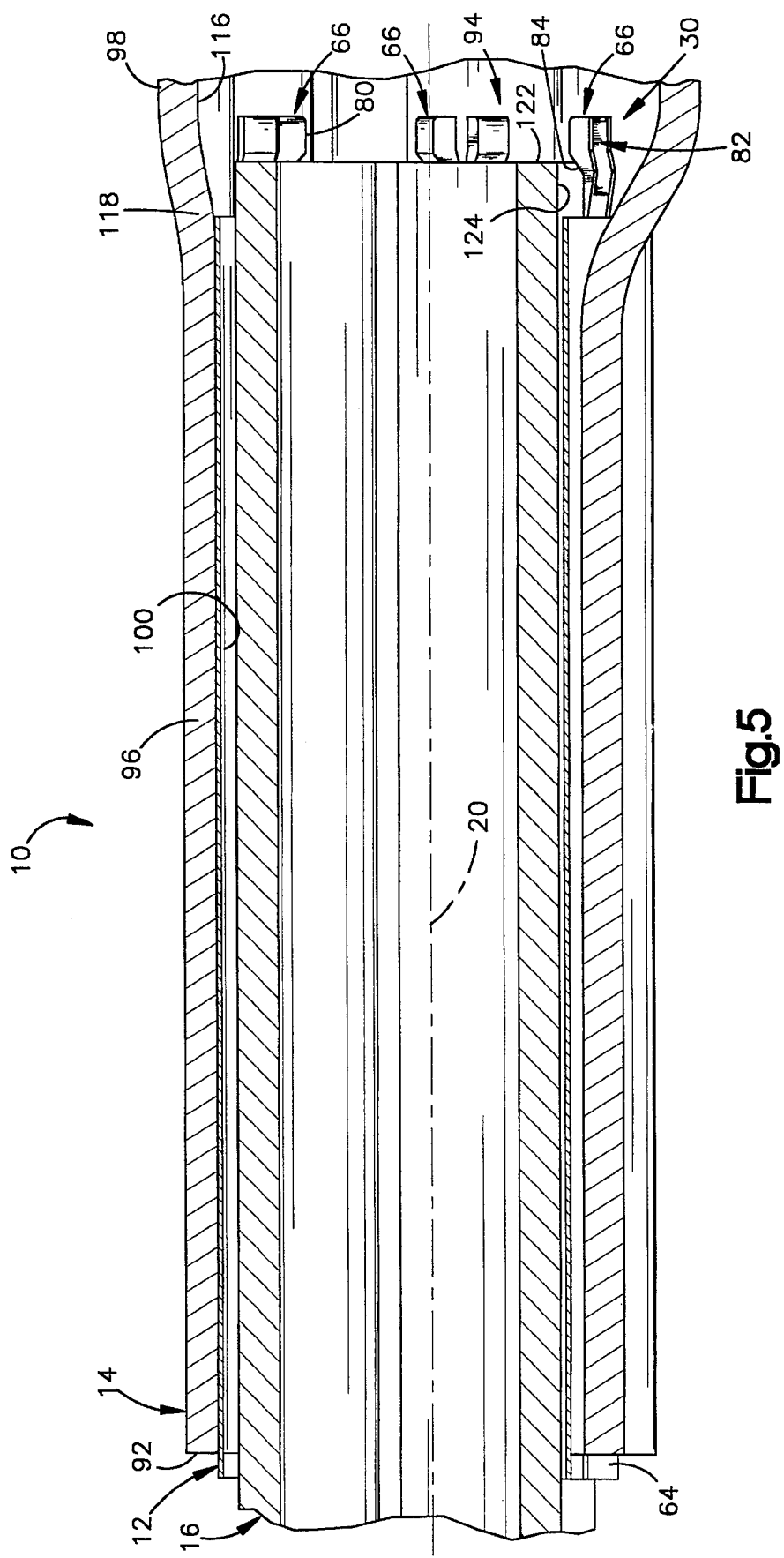
FIG. 5 is a sectional view taken along line 5—5 of FIG. 3.

The first shaft 14 (FIG. 5) is preferably made of non-heat treated 1010 steel. The first shaft 14 has an open end 92 and a hollow interior 94. The first shaft 14 includes a generally star-shaped fluted portion 96, and a cylindrical portion 98. The fluted portion 96 extends from the open end 92 to the cylindrical portion 98. The fluted portion 96 has an interior surface 100. Preferably, the interior surface 100 has a finish of 30–60 RMS (Root Mean Square). The interior surface 100 a plurality (five) elongate grooves 102 (FIG. 3). The elongate grooves 102 are open toward the axis 20. Each elongate groove 102 extends parallel to the axis 20 and extends the length of the fluted portion 96 (FIG. 5) between the open end 92 and the cylindrical portion 98. Thus, the elongate grooves 102 each have two ends, one at the open end 92 of the first shaft 12 and one remote therefrom.

Each elongate groove 102 (FIG. 3) has a bottom (radially outward) surface 106 and two side surfaces 108. The side surfaces 108 are identified as 108a and 108b, respectively, adjacent to each side of the respective bottom surface 106. The bottom surfaces 106 and the side surfaces 108 extend the length of the fluted portion 96.

Each bottom surface 106 defines a center recess 110 and two inward steps 112 located on each side of the center recess 110 and adjacent to the sided surfaces 108. The center recesses 110 are located a distance from the axis 20. The inward steps 112 extend generally toward the axis 20 from the respective center recess 110. Each of the center recesses 110 and the inward steps 112 extend the length of the fluted portion 96.

The cylindrical portion 98 (FIG. 5) has an interior surface 116 which is cylindrical in shape. The interior surface 116 is located at a radial distance from the axis 20 which is greater than the radial distance between any point on the interior surface 100 of the fluted portion 96 and the axis 20. Thus, the junction between the fluted portion 96 and the cylindrical portion 98 defines a smoothly formed, tapering annular step 118. The tapering annular step 118 can be formed by a cold forming.

The second shaft 16 is preferably made of non-heat treated 1010 steel. The second shaft 16 has an end 122 and an exterior surface 124. The exterior surface 124 preferably has a finish of 30–60 RMS. The exterior surface 124 has a plurality (five) elongate projections 126 (FIG. 3) which extend parallel to the axis 20. Each elongate projection 126 has a tip (radially outward) surface 128 and two side surfaces 130. The side surfaces 130 are identified as 130*a* and 130*b*, respectively, on each side of the elongate projections 126. The tip surfaces 128 and the side surfaces 130 extend the length of the elongate projections 126. The second shaft 16 is shown as having a hollow interior, however, the second shaft 16 may be solid.

Figure 6:
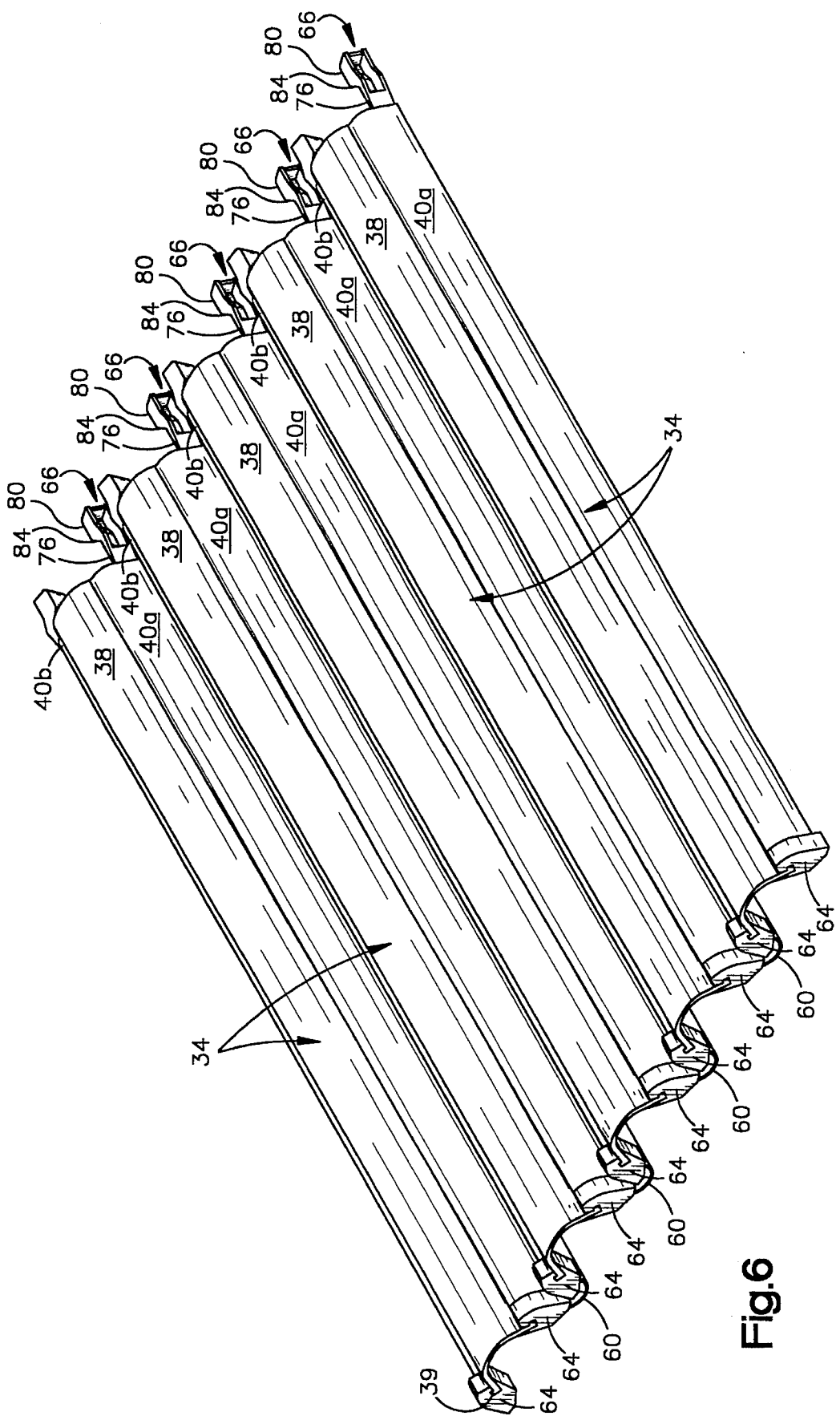
FIG. 6 is a view of the part shown in FIG. 2 during an assembly step.

During manufacture of the shaft assembly 10, the bushing 12 is made as a substantially flat, elongate member, as shown in FIG. 6. The spring portions 38 are positioned in a mold (not shown). The mold has cavities corresponding in shape to the wedge-shaped side portions 40, the hinges 60, the flange segments 64, and the tangs 66.

The wedge-shaped side portions 40, the hinges 60, the flange segments 64 and the tangs 66 are injection molded such that the wedge-shaped side portions 40 enclose the foot portions 39 and the hinges 60 are integral with respective wedge-shaped side portions 40. Thus, the wedge-shaped side portions 40 are connected to the respective spring portions 38 and adjacent lobes 34 are connected to the respective hinges 60. The flange segments 64 and the tangs 66 are integrally formed with the respective wedge-shaped side portions 40.

The bushing 12 is rolled into a tube-like member, as shown in FIG. 2. The flange segments 64 extend transverse to the axis 20 and extend axially outward. The hinges 60 are flexed. The bushing 12 (FIG. 5) is inserted, second end portion 30 first, into the hollow interior 94 of the first shaft 14. In the preferred embodiment, the bushing 12 is lubricated with a lithium grease prior to insertion, for wear prevention.

During insertion of the bushing 12 into the first shaft 14, each lobe 34 (FIG. 3) is mated with, and slides along, a respective one of the elongate grooves 102. The hinges 60 extend between respective adjacent elongate grooves 102. The wedge-shaped side portions 40 engage the side surfaces 108 of the elongate grooves 102. The spring portions 38 engage the end surfaces 106 of the elongate grooves 102.

During insertion, the exterior surface 74 (FIG. 5) of each tang 66 engages the interior surface 100 of the fluted portion 96. Thus, the tangs 66 are resiliently deflected inwardly. The bushing 12 slides into the first shaft 14 until the flange segments 64 are located adjacent to the open end 92 of the first shaft 14. Simultaneously, the tangs 66 enter the cylindrical portion 98 of the first shaft 14 and the tangs 66 snap radially outwardly beyond the tapering annular step 118.

The bushing 12 is held in the desired position within the first shaft 14 by the flange segments 64 engaging the open end 92 and the exterior surface 74 of the tangs 66 engaging the tapering annular step 118. Thus, axial movement of the bushing 12 relative to the first shaft 14 is prevented.

The second shaft 16 is inserted, end 122 first, into the hollow center 22 of the bushing 12. In the preferred embodiment, the second shaft 12 is lubricated with a lithium grease prior to insertion, for wear prevention. During insertion of the second shaft 16 into the bushing 12, each elongate projection 126 (FIG. 3) is mated with, and slides along, a respective lobe 34. Moreover, each elongate projection 126 mates with, and partially extends into, a respective elongate groove 102.

Side surfaces 130 of the elongate projections 126 are located opposite respective side surfaces 108 of the elongate grooves 102. Each pair of respective opposing side surfaces 108 and 130 defines an elongate wedge-shaped gap 138 between the elongate projections 126 and the elongate grooves 102. The gaps 138 are identified as 138*a* and 138*b*, respectively. Each gap 138 tapers generally inwardly along the respective side surface 130, away from the end surface 128.

The elongate projections 126 press the lobes 34 into the elongate grooves 102. The spring portions 38 press against respective bottom surfaces 106 of the elongate grooves 102 and are stressed. Each spring portion 38 biases the respective wedge-shaped side portions 40 generally inwardly into the gaps 138.

Each spring portion 38 establishes a neutral position wherein the outer surface 52 of each wedge-shaped side portion 40 is spaced away from the respective inward step 112 on the first shaft 14, as shown in FIG. 3. The first side surface 56 of each wedge-shaped side portion 40 presses against the respective side surface 130 of the elongate projections 126. The second side surface 58 of each wedge-shaped side portion 40 presses against the respective side surface 108 of the elongate grooves 102. The hinges 60 are flexed to extend between respective adjacent elongate grooves 102.

Each tip surface 128 of the elongate projections 126 is radially spaced away from the respective interior surface 44 of the spring portions 38. In the preferred embodiment, the shaft assembly 10 is packed with a lithium grease, for wear prevention. The second shaft 16 (FIG. 5) is axially movable along the bushing 12 past the tangs 66. Upon engagement of the second shaft 16 with the tangs 66, the tangs 66 are further pressed into engagement with the tapering annular step 118 to further prevent axial movement between the bushing 12 and the first shaft 14.

In operation, the first and second shafts 14 and 16 are relatively movable along the axis 20 while each maintains contact with the bushing 12. Upon rotation of one of the first and second shafts 14 and 16, the bushing 12 transmits rotational torque to the other of the first and second shafts 14 and 16. Thus, the first and second shafts 14 and 16 are rotated in unison because of the resistance to relative rotation provided by the wedge-shaped side portions 40.

Normally, the first and second shafts 14 and 16 do not rotate relative to each other. However, if a sufficient torque develops between the first and second shafts 14 and 16, the first and second shafts 14 and 16 are permitted to relatively rotate a very small amount. Typically, the first and second shafts 14 and 16 do not relatively rotate until the torque exceeds 60–120 inch-pounds. The amount of relative rotation is less than 1°.

Figure 4:
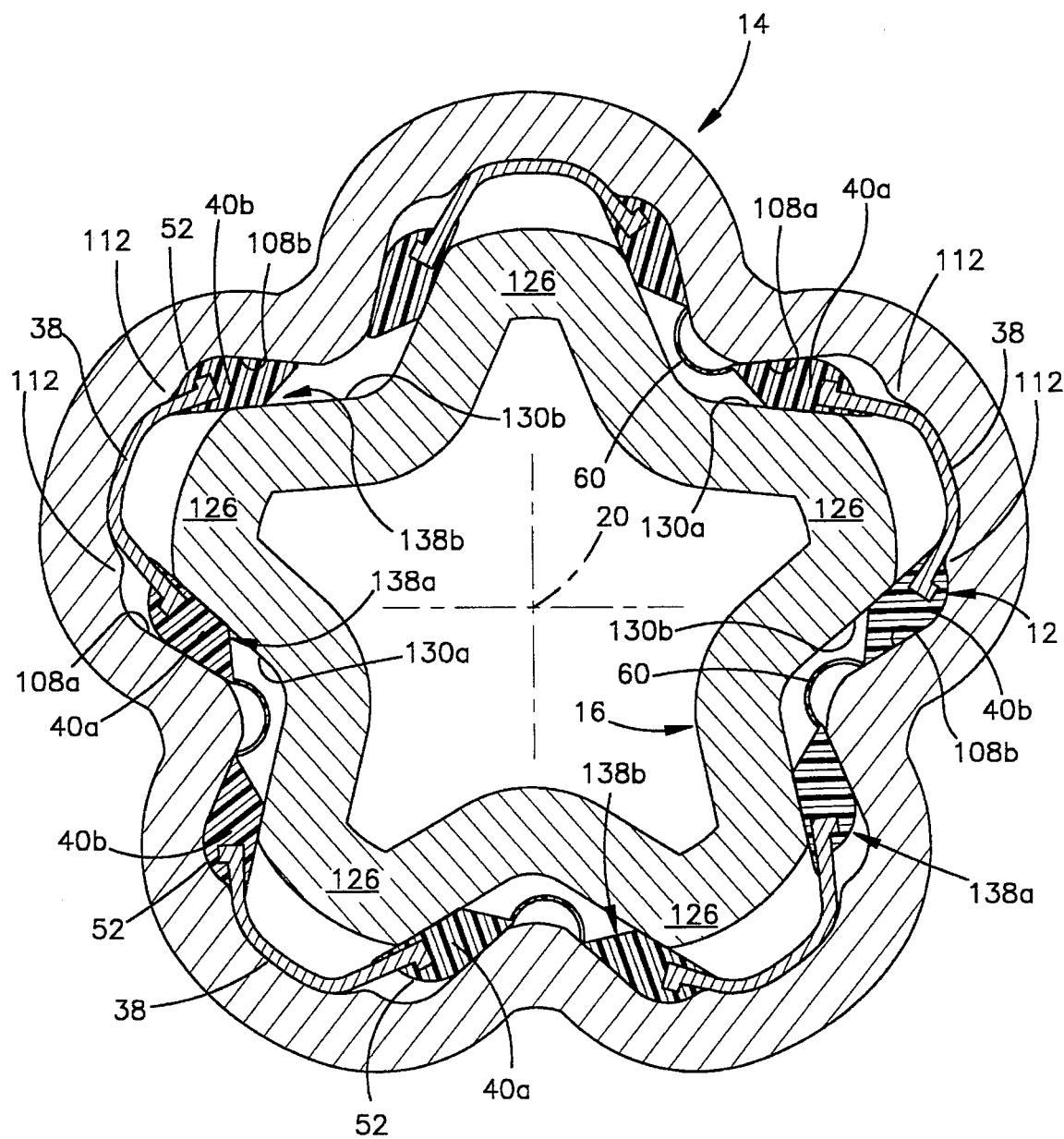
FIG. 4 is a view similar to FIG. 3 but showing parts in another operational position.

The small relative rotation between the first and second shafts 14 and 16 is permitted by the bushing 12. For example, FIG. 4 shows the second shaft 16 rotated clockwise, from the neutral position of FIG. 3, relative to the first shaft 14. During rotation of the second shaft 16 clockwise relative to the first shaft 14, the gaps 138*b* are narrowed and an increased pinching force is applied to wedge-shaped side portions 40*b* by the respective side surfaces 108*b* and 130*b*. The increased pinching force cams, or slides, the wedge-shaped side portions 40*b*, transverse to the axis 20 along the respective gaps 138*b*, outwardly toward the respective inward step 112 against the bias of the respective spring portion 38. The wedge-shaped side portions 40*b* are moved partially out of the respective gaps 138*b*. The wedge-shaped side portions 40*b* may move outward until the respective outer surfaces 52 engage the respective inner step 112. Simultaneously, the gaps 138*a* are expanded and the wedge-shaped side portions 40a are cammed transverse to the axis 20 along the respective gaps 138a inwardly, away from the respective inward step 112, under the bias of the respective spring portion 38.

A similar relative rotation between the first and second shafts 14 and 16 may occur when the second shaft 16 tends to rotate counterclockwise, from the neutral position shown in FIG. 3, relative to the first shaft 14. For such a counterclockwise rotation, the wedge-shaped side portions 40a are cammed transverse to the axis 20 outwardly, toward respective inward steps 112, and the wedge-shaped side portions 40b are cammed transverse to the axis 20 inwardly, away from respective inward steps 112.

Moreover, because the spring portions 38 are stressed upon assembly of the shaft assembly 10, the spring portion 38 continuously bias the wedge-shaped side portions 40 into engagement with the respective side surfaces 130 and respective side surfaces 108 as wear occurs. Thus, loose play between the first and second shafts 14 and 16 is prevented from developing. Also, the shaft assembly 10 has a self-cleaning action. As the wedge-shaped side portions 40 are cammed along the gaps 138, debris is deposited in the space between the tip surfaces 128 of the elongate projections 126 and the interior surface 44 of the spring portions 38 and the space adjacent to the inner surface 54 of the wedge-shaped side portions 40.

From the above description of the invention, those skilled in the art will perceive improvements, changes and modifications. Such improvements, changes and modifications within the skill of the art are intended to be covered by the appended claims.

Having described the invention, the following is claimed:

1. A shaft assembly comprising:

a tubular first shaft extending along an axis, said first shaft having an open end and an interior surface having a plurality of elongate grooves extending parallel to the axis;

a second shaft extending along the axis, said second shaft having an end portion located within said first shaft, said second shaft having an exterior surface having a plurality of elongate projections extending parallel to the axis and mating with said elongate grooves, said exterior surface of said second shaft and said interior surface of said first shaft defining an inwardly tapered gap on each side of each elongate projection; and bushing means for transmitting torque between said first and second shafts, said bushing means extending into said first shaft, said bushing means including a plurality of wedge segments each located within a respective one of said tapered gaps for resisting relative rotation between said first and second shafts, said bushing means including spring means for biasing each wedge segment into said respective tapered gap and into engagement with said exterior surface and said interior surface, at least some of said wedge segments being slidable transverse to the axis along said respective tapered gap and slidable relative to said exterior surface and said interior surface.

2. A shaft assembly as set forth in claim 1, wherein each of said wedge segments sliding inwardly along said respective tapered gap under the bias of said spring means for preventing rotational lash between said first and second shafts due to wear.

3. A shaft assembly as set forth in claim 1, wherein said spring means including a plurality of arcuate segments of said bushing means which engage said interior surface of said first shaft, each of said arcuate segments extending between two of said wedge segments for biasing each of said two of said wedge segments into said respective tapered gaps.

4. A shaft assembly as set forth in claim 3, wherein said bushing means being a rolled sleeve inserted into said first shaft, said wedge segments and said arcuate segments extending parallel to the axis.

5. A shaft assembly as set forth in claim 1, wherein said bushing means including a plurality of flexible hinges, each hinge connecting two of said wedge segments, said two wedge segments being located within adjacent elongate grooves.

6. A shaft assembly as set forth in claim 1, wherein said second shaft being rotatable relative to said first shaft about the axis, each of said elongate grooves having a bottom, some of said wedge segments being slidable along said interior surface of said first shaft toward a respective one of said bottoms during rotation of said second shaft relative to said first shaft, said some of said wedge segments being engageable with said respective bottoms to stop the sliding of said some of said wedge segments.

7. A shaft assembly as set forth in claim 6, wherein said some of said wedge segments being moved partially out of said respective tapered gaps during rotation of said second shaft relative to said first shaft.

8. A shaft assembly as set forth in claim 1, wherein said bushing means including restraint means for preventing axial movement of said bushing means relative to said first shaft, said restraint means including a flange means for abutting against said open end of said first shaft.

9. A shaft assembly as set forth in claim 1, wherein each elongate projection has a tip which is spaced from said bushing means.

10. A method of assembling a shaft assembly, said method comprising:

making a bushing as a sheet-like element with a longitudinal extent and having a plurality of longitudinally extending wedge-shaped portions, a plurality of spring portions, a plurality of hinge portions, a first projection and a second projection, said step of making a bushing including interconnecting pairs of adjacent wedge-shaped portions with one of the spring portions to form longitudinally extending lobes, interconnecting adjacent lobes with one of the hinge portions, creating the first projection at the first end portion of the bushing to extend transverse to the longitudinal extent of the bushing, and creating the second projection at a second end portion of the bushing to extend at least partially transverse to the longitudinal extent of the bushing;

rolling the bushing into a tube-like element such that the hinge portions are flexed and the first projection of the bushing extends radially outward to provide a flange;

providing a hollow first shaft which has an open end and an inner surface defining a plurality of elongate interior grooves with longitudinally extending sides;

providing a second shaft which has an end portion and an exterior surface defining a plurality of elongate exterior projections with longitudinally extending sides;

positioning the bushing within the first shaft, including positioning each of the hinge portions to extend between adjacent grooves of the first shaft, positioning each of the wedge-shaped portions in engagement with one of the sides of one of the elongate grooves, positioning one of the spring portions adjacent to a closed end of each of the elongate grooves, and positioning the first projection of the bushing such that it overlies the open end of the first shaft to prevent the first end portion of the bushing from entering the first shaft; and positioning the second shaft within the bushing, including positioning each side of each of the elongate projections in engagement with one of the wedge-shaped portions.

11. A method as set forth in claim 10, wherein said step of positioning the second shaft within the bushing is subsequent to the step of positioning the bushing within the first shaft and said step of positioning the second shaft within the bushing includes positioning the exterior surface of the second shaft spaced away from the interior surface of the first shaft to define inwardly tapered gaps located on each side of each of the elongate projections, and positioning the wedge-shaped portions in the tapered gaps.

12. A method as set forth in claim 10, wherein said step of positioning the bushing within the first shaft includes engaging the second projection of the bushing with a tapering step of the first shaft which has a radius greater than a radial distance of the elongate grooves.

13. A shaft assembly comprising:

a tubular first shaft extending along an axis, said first shaft having an open end and an interior surface having a plurality of elongate grooves extending parallel to the axis;

a second shaft extending along the axis, said second shaft having an end portion located within said first shaft, said end portion of said second shaft having an exterior surface having a plurality of elongate projections extending parallel to the axis and extending into said grooves; and bushing means for transmitting torque between said first and second shafts, said bushing means having bearing portions located in said grooves for transmitting torque between said projections and said interior surface defining said grooves, said bushing means including flange means for preventing axial movement of said bushing means relative to said first shaft, said flange means abutting against said open end of said first shaft, each of said grooves of said first shaft has a remote end located at a distance from said open end of said first shaft, said interior surface of said first shaft having a tapering step with an enlarged inner diameter located adjacent to said remote end of said grooves, said bushing means including tangs for resisting removal of said bushing means from said first shaft in an axial direction, said tangs extending into said step of said first shaft.

14. A shaft assembly as set forth in claim 13, wherein each of said tangs have a portion extending transverse to the axis for engaging said tapering step of said first shaft.

15. A shaft assembly comprising:

a tubular first shaft extending along an axis, said first shaft having an open end and an interior surface having a plurality of elongate grooves extending parallel to the axis;

a second shaft extending along the axis, said second shaft having an end portion located within said first shaft, said second shaft having an exterior surface having a plurality of elongate projections extending parallel to the axis and mating with said elongate grooves, said exterior surface of said second shaft and said interior surface of said first shaft defining an inwardly tapered gap on each side of each elongate projection; and bushing means for transmitting torque between said first and second shafts, said bushing means extending into said first shaft, said bushing means including a plurality of wedge segments each located within a respective one of said tapered gaps for resisting relative rotation between said first and second shafts, said bushing means including spring means for biasing each wedge segment into said respective tapered gap and into engagement with said exterior surface and said interior surface, at least some of said wedge segments being slidable transverse to the axis along said respective tapered gap and slidable relative to said exterior surface and said interior surface;

each of said elongate grooves having an end located at a distance from said open end of said first shaft, said interior surface having a tapering step with an enlarged inner diameter located at said ends of said elongate grooves, said bushing means including restraint means for preventing axial movement of said bushing means relative to said first shaft, said restraint means including tang means for preventing removal of said bushing means from said first shaft along an axial direction, said tang means extending into said tapering step of said first shaft.

* * * * *